(12) United States Patent
Al-Qasim et al.

(10) Patent No.: US 11,920,446 B2
(45) Date of Patent: Mar. 5, 2024

(54) METHODS FOR FOAM AND GEL INJECTIONS INTO A WELL AND ENHANCED FOAMING AND GELATIONS TECHNIQUES

(71) Applicant: SAUDI ARABIAN OIL COMPANY, Dhahran (SA)

(72) Inventors: Abdulaziz S. Al-Qasim, Dammam (SA); Marwah M. Alsinan, Al Qatif (SA); Jun Gao, Dhahran (SA); Hyung Tae Kwak, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/644,109

(22) Filed: Dec. 14, 2021

(65) Prior Publication Data
US 2023/0184072 A1   Jun. 15, 2023

(51) Int. Cl.
| | |
|---|---|
| *E21B 43/16* | (2006.01) |
| *E21B 43/00* | (2006.01) |
| *E21B 47/00* | (2012.01) |

(52) U.S. Cl.
CPC .......... *E21B 43/166* (2013.01); *E21B 43/003* (2013.01); *E21B 47/00* (2013.01)

(58) Field of Classification Search
CPC ....... E21B 43/166; E21B 43/003; E21B 47/00
See application file for complete search history.

(56) References Cited

U.S. PATENT DOCUMENTS

| | | |
|---|---|---|
| 3,768,560 A | 10/1973 | Hill et al. |
| 4,181,178 A | 1/1980 | Savins |
| 4,554,974 A | 11/1985 | Kalpakci et al. |
| 4,844,163 A | 7/1989 | Hazlett et al. |
| 4,921,576 A | 5/1990 | Hurd |
| 5,762,141 A * | 6/1998 | Hutchins .................. C08F 8/00 507/903 |
| 7,040,390 B2 | 5/2006 | Tubel et al. |
| 9,459,330 B2 | 10/2016 | Freedman et al. |
| 9,804,062 B2 | 10/2017 | Collins et al. |
| 2007/0142235 A1 | 6/2007 | Berger et al. |

(Continued)

FOREIGN PATENT DOCUMENTS

| | | |
|---|---|---|
| CA | 2896222 A1 | 1/2016 |
| CN | 106050202 A | 10/2016 |

(Continued)

OTHER PUBLICATIONS

San, Jingshan et al. "Nanoparticle-Stabilized Carbon Dioxide Foam Used in Enhanced Oil Recovery: Effect of Different Ions and Temperatures" Oct. 2017 SPE Journal pp. 1416-1423 (9 pages).

(Continued)

*Primary Examiner* — Silvana C Runyan (74) *Attorney, Agent, or Firm* — Osha Bergman Watanabe & Burton LLP (57) ABSTRACT

A method includes providing an injection well extending from a surface into a formation and alternatingly pumping a foam injectant and a gel injectant into the injection well, wherein the foam injectant includes a liquid phase with a surfactant and water and a gas phase and the gel injectant includes a water-soluble polymer and a crosslinker. The foam injectant and the gel injectant are injected at separate times and sequentially.

20 Claims, 6 Drawing Sheets

(56) References Cited

U.S. PATENT DOCUMENTS

| | | | |
|---|---|---|---|
| 2016/0168984 A1* | 6/2016 | Fripp | E21B 47/00 |
| | | | 367/83 |
| 2017/0081583 A1* | 3/2017 | Han | C09K 8/584 |
| 2019/0186247 A1* | 6/2019 | Lau | E21B 43/166 |
| 2019/0233712 A1* | 8/2019 | Fathi Najafabadi | C09K 8/588 |
| 2020/0057172 A1* | 2/2020 | Alharbi | C09K 8/58 |
| 2020/0172795 A1* | 6/2020 | AlYousif | E21B 43/166 |

FOREIGN PATENT DOCUMENTS

| | | |
|---|---|---|
| CN | 111793489 A | 10/2020 |
| WO | 1986000330 A1 | 1/1986 |

OTHER PUBLICATIONS

Friedmann, F. et al. "Experimental and Simulation Study of High-Temperature Foam Displacement in Porous Media" SPE Reservoir Engineering, Feb. 1991, pp. 37-45 (9 pages).

Lee, Hae Ok et al. "Laboratory Measurements of CO2-Foam Mobility" SPE Reservoir Engineering, May 1990 pp. 193-197 (5 pages).

Rossen, W. R. et al. "Success of Foam SAG Processes in Heterogeneous Reservoirs" Society of Petroleum Engineers, JPT, Jan. 2008 (3 pages).

Patton, J. T. et al. "Rheology of Mobility-Control Foams" Society of Petroleum Engineers, Jun. 1983 pp. 456-460 (5 pages).

Tsau, J.-S. et al. "Assessment of Foam Properties and Effectiveness in Mobility Reduction for CO2-Foam Floods" Society of Petroleum Engineers 1997 pp. 117-126 (10 pages).

Alshehri, Amar J. et al. "A Study of Gel-Based Conformance Control Within Fractured Carbonate Cores Using Low-Field Nuclear-Magnetic-Resonance Techniques" SPE Reservoir Evaluation & Engineering, Aug. 2019 pp. 1063-1074 (12, pages).

Aroonsri, Archawin et al. "Conditions for Generating Nanoparticle-Stabilized CO2 Foams in Fracture and Matrix Flow" SPE 166319, 2013 (19 pages).

International Search Report and Written Opinion of the International Searching Authority dated Apr. 20, 2023 in corresponding International (PCT) Application No. PCT/US2022/052844, 12 pages.

Vinci Technologies, "NMRFLOOD-NMR coreflood"; <https://www.vinci-technologies.com/rocks-and-fluids/special-core-analysis/nmr-experiments/nmrflood-nmr-coreflood/113452/>; Accessed Oct. 16, 2023 (3 pages).

Kwak, Hyung Tae et al., "Close Monitoring of Gel Based Conformance Control by NMR Techniques"; Proceedings of the SPE Middle East Oil & Gas Show and Conference; Paper No. SPE-183719-MS; pp. 1-12; Mar. 6, 2017 (12 pages).

Forouzanfar, Fahim et al., "A two-stage well placement optimization method based on adjoint gradient"; Proceedings of the SPE Annual Technical Conference and Exhibition; Paper No. SPE-135304-MS; pp. 1-18; Sep. 19, 2010 (18 pages).

Buzi, Erjola et al., "Sensor Ball: An Autonomous Untethered Logging Platform"; Proceedings of the Offshore Technology Conference; Paper No. OTC-30538-MS; pp. 1-10; May 4, 2020 (10 pages).

Denney, Dennis, "Success of SAG-Foam Processes in Heterogeneous Reservoirs"; Journal of Petroleum Technology; vol. 60, Issue 01, Paper No. SPE-0108-0043-JPT; pp. 43-46; Jan. 2008 (3 pages).

Canbolat, Serhat et al., "Polymer gel conformance on oil recovery in fractured medium: Visualization and verification"; Journal of Petroleum Science and Engineering; vol. 182, Article 106289; pp. 1-16; Nov. 2019 (16 pages).

* cited by examiner

METHODS FOR FOAM AND GEL INJECTIONS INTO A WELL AND ENHANCED FOAMING AND GELATIONS TECHNIQUES

BACKGROUND

Enhanced oil recovery (EOR) methods may be used to extract oil from a reservoir that may not otherwise be extractable using conventional primary methods of recovery. EOR operations may generally include injecting a fluid (e.g., a gas, a polymer mixture, or a liquid) down an injection well to alter the downhole formation pressure and/or improve oil displacement or fluid flow in the reservoir. Examples of types of EOR operations include chemical flooding (e.g., alkaline or micellar polymer flooding), miscible displacement (e.g., injection of a miscible gas such as $CO_2$, hydrocarbon gases, or mixtures thereof), and thermal recovery (e.g., a steamflood or in-situ combustion).

In miscible displacement EOR methods, a gas such as $CO_2$ is injected into a reservoir, where it then expands and pushes oil through the reservoir formation to a production well. As the gas moves through the formation, the gas may also dissolve in the oil and lower the oil's viscosity, thereby improving the mobility of the oil through the reservoir formation. When $CO_2$ gas is pumped into a reservoir at a minimum miscibility pressure (MMP), the $CO_2$ may have the same density as the oil, and the $CO_2$ may be miscible with the oil, thereby improving sweep of the oil to the production well.

However, altering the density of injectants (e.g., $CO_2$) may create challenges related to viscous fingering (where the interface between the reservoir fluids and injectant moves through the formation unevenly, creating a fingered profile), which may lead to early breakthrough of the injectant, and gravity override (where the less dense fluid flows preferentially on the top of a reservoir and the more dense fluid flow on the bottom) within the reservoir. To overcome density and mobility challenges with conventional miscible displacement EOR, methods have been proposed to increase the viscosity of the injectants and reduce its mobility through the reservoir. For example, surfactant-induced $CO_2$ foam and other types of $CO_2$ foam have been used for mobility control in $CO_2$ flooding operations. However, such foams may experience different stability degradation over time and along a distance through different reservoir conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed relate to injection methods that include providing an injection well extending from a surface into a formation and alternatingly pumping a foam injectant and a gel injectant into the injection well. The foam injectant may include a liquid phase with a surfactant and water and a gas phase, and the gel injectant may include a water-soluble polymer and a crosslinker. The foam injectant and the gel injectant may be injected at separate times and sequentially.

In another aspect, embodiments disclosed herein relate to injection methods that include providing an injection well extending from a surface into a formation and pumping a gel injectant and a foam injectant simultaneously through the injection well and into the formation. The foam injectant may be made of a liquid phase having a surfactant and water and a gas phase. The gel injectant may be made of a water-soluble polymer and a crosslinker.

In yet another aspect, embodiments disclosed herein relate to systems that include an injection well extending from a surface into an underground formation, wherein the injection well includes an injection wellhead positioned at an opening to the injection well at the surface and injection tubing extending from the injection wellhead a depth into the injection well. The system may also include a production well extending from the surface and in fluid communication with the underground formation. A foam feed may be fluidly connected to the injection well via a foam feed line, and a gel feed may be fluidly connected to the injection well via a gel feed line. At least one valve may be positioned along at least one of the foam feed line and the gel feed line to selectively open and close the foam feed line and the gel feed line.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments disclosed herein relate generally to systems and methods for injecting injectants, including both foam injectants and gel injectants, into an injection well, which may be used for secondary or tertiary recovery operations. For example, injection methods according to embodiments of the present disclosure may include injecting both a foam injectant and a gel injectant through an injection well into a formation, and as the injectants are injected into the formation, the injectants may displace oil within the formation. The injectants may drive oil through the formation toward a production well, where the oil may be collected at the surface of the production well. Injection methods disclosed herein may be performed after a waterflooding method (e.g., as a tertiary recovery process) or may be performed as a secondary recovery process (where waterflooding is not performed prior to the injection method).

Figure 1:
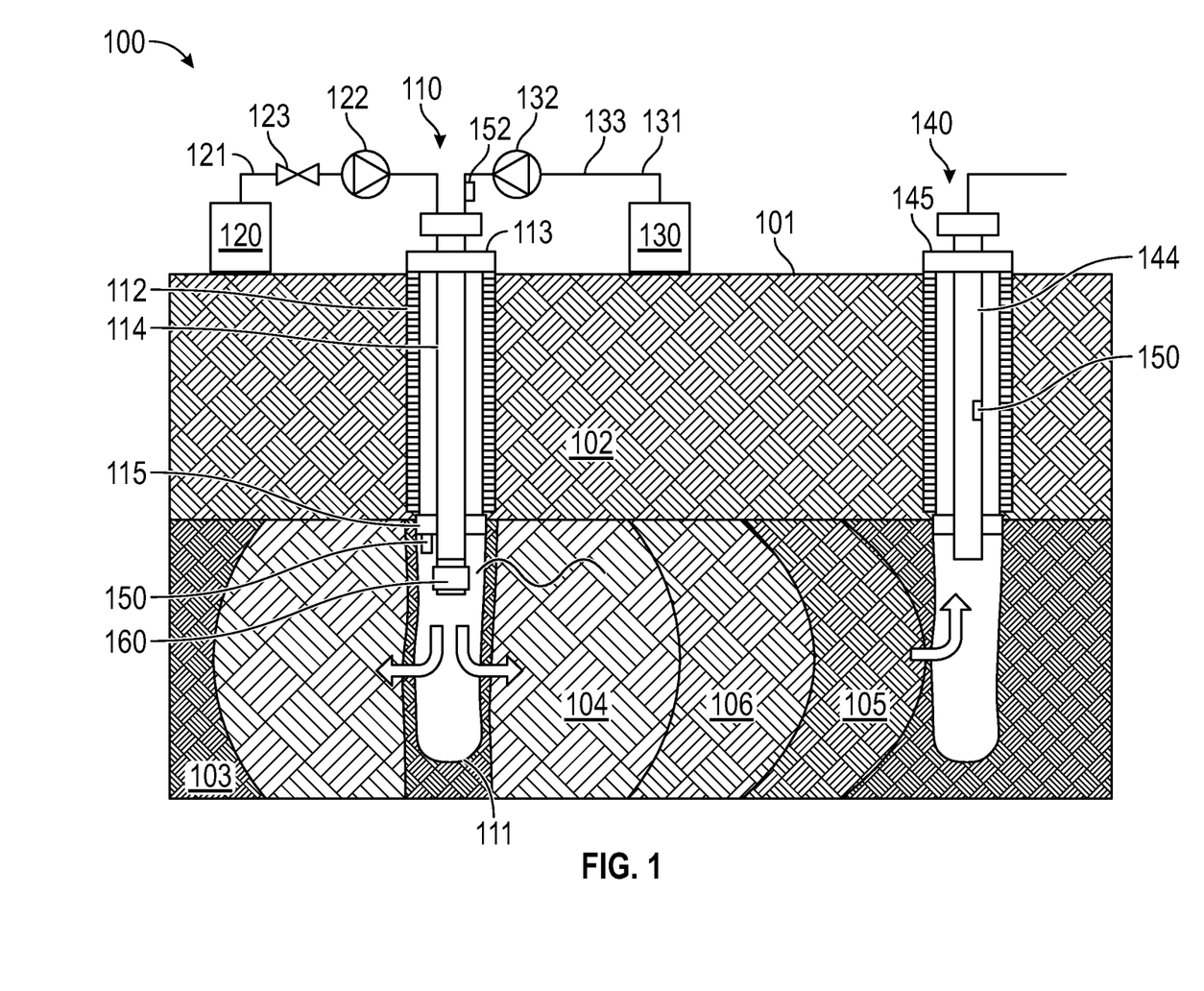
FIG. 1 shows an injection system according to embodiments of the present disclosure.

FIG. 1 shows an example of a system 100 according to embodiments of the present disclosure that may be used for injecting injectants, including both foam injectants and gel injectants, into an injection well 110 extending from a surface 101 into an underground formation 102. One or more components shown or described in the system 100 may be duplicated or omitted depending on injection operation to be performed. As used herein, a formation 102 may refer to a subsurface body of rock that is either heterogeneous or substantially homogeneous. A formation 102 may include, for example, a reservoir formation having sufficient porosity and permeability to store and transmit fluids (e.g., oil and gas), cap rock formed of a layer of impermeable rock, and other layers of permeable or impermeable rock.

The injection well 110 may be formed by drilling a wellbore 111 from the surface 101 a depth into the formation 102 until reaching a target formation 103 (e.g., a reservoir). As the wellbore 111 is drilled, sections of casing 112 may be cemented around the wellbore to case selected portions of the wellbore 111, which may prevent fluid flow between the cased portions of the wellbore and the surrounding formation.

An injection wellhead 113 may be positioned at an opening to the injection well 110, at the surface 101, to provide surface termination of the wellbore 111. The injection wellhead 113 may include, for example, a system of spools, flow paths, valves, and assorted adapters that may provide pressure control of the injection well, casing hangers for hanging casing during construction of the injection well, equipment for hanging downhole tubing (e.g., an injection string), and equipment for connecting a tree and/or other surface flow-control devices.

Additionally, an injection well 110 may include an injection string 114 (e.g., a string of piping connected together in an end-to-end fashion) extending from the wellhead 113 a depth into the injection well 110. Prior to injecting injectants down the injection well 110, a packing device 115 or other sealing device may be provided around the injection string 114 to seal an upper section of the injection well 110 from an injection portion of the injection well 110. The injection portion of the injection well 110 may have an exposed or uncased wellbore 111 wall, which may allow access for injectants to flow from the injection portion of the injection well 110 into the target formation 103.

The system 100 may also include an injectant feed system set up at the surface 101 of the injection well 110, which may include a plurality of interconnected flow lines and valves for directing injectants from a feed source into the injection well 110. Injectants may include both foam injectants and gel injectants.

A foam injectant may include a liquid phase composed of a surfactant and water and a gas phase composed of a gas. Surfactants used to form a foam injectant may include cationic surfactants, anionic surfactants, nonionic surfactants, or Zwitterionic surfactants. For example, lauramidopropyl betaine may be used as a surfactant. Examples of anionic surfactants include alkyl polyalkoxy alkyl sulfonate or alkyl aryl polyalkoxy alkyl sulfonate (which may be used without a surfactant or with alkyl sulfonate or alkyl aryl sulfonate cosurfactants), N-ethoxy sulfonate (AV-70 or AV-150), docusate sodium (which may be used with synperonic PE/F68 viscosity reduction co-surfactant), alpha-olefin sulfonate, internal-olefin sulfonate, gemini anionic surfactant, sulfonated, ethoxylated alcohol, and alcohol or alkyl phenol (which may be used without a cosurfactant or with petroleum sulfonate, alkyl sulfonate, or alkyl aryl sulfonate cosurfactants). Examples of nonionic surfactants include alkyl ethoxy carboxylated (AEC) (which may be used with the addition of anionically modified APG to enhance solubility or C19-28 IOS as co-surfactant), alkyl polyglycoside (APG), poly (Ethylene/Propylene) glycol ether, secondary alcohol "N" ethoxylate/propoxylate (which may be used with a cationic cosurfactant such as DTAB to increase the cloud point), nonylphenol "N" ethoxylate (which may be used with cationic cosurfactant such as DTAB, Coco Alkyl Trimethyl Ammonium Chloride or Stearyl Trimethyl Ammonium Chloride), tridecyl alcohol 30 ethoxylate (TDA 30 EO), and triphenylmethane (TPM). Examples of cationic surfactants that may be used include cetyl trimethyl ammonium bromide (CTAB) (which may be used with nano silica particles), coco alkyl trimethyl ammonium chloride (which may be used with a nonyl phenol 10 ethoxylate cosurfactant to increase the cloud point to 130), stearyl trimethyl ammonium chloride, dodecyl trimethyl ammonium bromide (DTAB) (which may be used with a nonionic cosurfactant to increase the cloud point to 130), and ethoxylated alkyl amine.

The gas used to form foam injectants may include, for example, nitrogen gas, carbon dioxide ($CO_2$) gas, other inert gases, and mixtures thereof. Water used to form foam injectants may be seawater, fresh water, filtered water, or other types of water.

Components of a foam injectant may be provided in different amounts, where water and gas may form a majority of the foam injectant. For example, a foam injectant may be formed with an amount of surfactant ranging from about 0.2% vol. to about 0.8% vol. (e.g., 0.5% vol.), an amount of water ranging from about 20% vol. to about 40% vol. (e.g., 30% vol.), and an amount of gas ranging from about 60% vol. to about 80% vol. (e.g., 70% vol.).

Generally, foam injectants may be provided from a foam feed 120 and may include multiple components provided from a shared source or multiple different sources. For example, components of a foam feed 120 may include a surfactant, a gas (e.g., a gas selected from nitrogen gas and carbon dioxide gas), and water. The surfactant may be provided from a tank or other container containing the surfactant, and the gas may be provided from either a different tank or may be collected from a nearby production well. Water used to form a foam injectant may be provided at the surface 101 with the other components of the foam feed 120 or may be provided within the target formation 103. In some embodiments, the components of a foam feed 120 may be premixed and provided from a single source. Different methods for mixing and foaming the foam feed 120 to provide foam injectants are described in more detail below.

One or more foam feed lines 121 may be fluidly connected to the foam feed 120 (e.g., including one or more containers holding components of the foam feed 120) and extend to the injection wellhead 113 to fluidly connect the foam feed 120 to the injection well 110. One or more injection pumps 122 may be fluidly connected to the foam feed line(s) 121 to pump foam feed 120 into the injection well 110. Further, one or more valves 123 may be positioned along the foam feed line(s) 121, where the valve(s) 123 may be operated to control the flow of foam feed 120 into the injection well 113. For example, in embodiments where the foam feed 120 includes multiple foam component sources (e.g., a surfactant source, a gas source, and/or a water source), a foam feed line 121 may be fluidly connected to each foam component source, and a valve 123 may be positioned along each foam feed line 121 to the different foam component sources. The valves 123 may be operated to individually control the flow of each foam component into the injection well 110. For example, in embodiments having components of a foam injectant pumped down the injection well 110 separately and sequentially, valves 123 positioned along foam feed lines 121 to each of the components in the foam feed 120 may be sequentially opened and closed to allow the components of the foam feed 120 to flow through the foam feed lines 121 at separate times.

According to embodiments of the present disclosure, gel injectants may be formed of a water-soluble polymer and a crosslinker. The components of a gel injectant may also be mixed with water (e.g., seawater), which may be provided in the formation or at the surface 101. After the components of a gel injectant are mixed together, and after an amount of time (a gelation time) has passed for sufficient crosslinking, a gel may be formed. The gelation time may be affected by, for example, temperature, pH, salinity, gellant composition, and other formation conditions. The gelation time for a gel injectant to form a gel may refer to the point at which a moderately flowing gel is formed. As used herein, a gel refers to a viscoelastic material that exhibits properties between elastic solids and viscous liquids. Gelation time may be determined in a laboratory to measure properties such as gel strength and viscosity or to observe its flow behavior as a function of time. The gelation time may be defined when a selected critical value is reached. Viscoelastic properties such as elastic modulus and storage modulus may be used to distinguish gel from other solutions.

Examples of water-soluble polymers used in gel injectants may include, for example, polymers having carboxylate groups such as sulfonated polyacrylamide and high- or low-molecular weight (MW) hydrolyzed polyacrylamides (HPAM). Examples of crosslinkers used in gel injectants may include, for example, metallic crosslinkers, such as trivalent chromium (Cr(III)), or organic crosslinkers. In some embodiments, a gel injectant may be formed from a combination of components including sulfonated polyacrylamide, a Cr(III) crosslinker, and sea water. Examples of combinations of polymers and crosslinkers that may be used to form a gel system may include, for example, Cr(III) acetate with high-MW HPAM, Cr(III) acetate with low-MW HPAM, Cr(III) propionate HPAM, Cr(III) lactate/carboxylate HPAM, Cr(III) malonate HPAM, preformed particle gels (PPG), nanoparticles (e.g., nanospheres), silicates (e.g., Injectrol, Zonelock, Pemablock, SiljelV, Silica-Polymer-Initiator), sodium silicate and aminopropyltriethoxysilane, in situ polymerization of acrylamides, acrylates, or derivatives, polyethyleneimine with t-butylacrylate/acrylamide copolymers, formaldehyde (HCHO) or hexamethylenetetramine (HMTA) and phenolic/hydroquininone crosslinkers with PAM copolymers and terpolymers, crosslinked 2-Acrylamido-2-methylpropane sulfonic acid (AMPS), N-Vinylpyrrolidone (NVP), acrylamide/acrylate copolymers and terpolymers, amphoteric polymers and terpolymers, hydrophobically modified poly[2-(dimethylamino)ethyl methacrylate] (pDMAEMA), crosslinked expandable polymeric microparticles, Al-citrate/HPAM, Al-citrate/HPAM/CPAM, $AlCl_3$/OH-(DGS or Delayed Gelation System), and $Fe(OH)_3$ (Hungarian precipitation process).

According to embodiments of the present disclosure, a gel injectant may have a composition including a polymer present in a concentration ranging from 100 ppm to 5,000 ppm of the gel injectant, a crosslinker present in a concentration ranging from 20:1 to 60:1 in a polymer to crosslinker ratio, and water forming the remaining amount of the gel injectant.

Gel injectants may be provided from a gel feed 130 and may include multiple components provided from a shared source or multiple different sources. For example, components of a gel feed 130 may include a polymer, a crosslinker, and water each provided from separate tanks. Different methods of forming and injecting gel injectants are described in more detail below.

One or more gel feed lines 131 may be fluidly connected to the gel feed 130 (e.g., including one or more containers holding components of the gel feed 130) and extend to the injection wellhead 113 to fluidly connect the gel feed 130 to the injection well 110. One or more injection pumps 132 may be fluidly connected to the gel feel line(s) 131 to pump gel feed 130 into the injection well 110. Further, one or more valves 133 may be positioned along the gel feed line(s) 131, where the valve(s) 133 may be operated to control the flow of gel feed 130 into the injection well 113. For example, in embodiments where the gel feed 130 includes multiple gel component sources (e.g., a polymer source, a crosslinker source, and/or a water source), a gel feed line 131 may be fluidly connected to each gel component source, and a valve 133 may be positioned along each gel feed line 131 to the different gel component sources. The valves 133 may be operated to individually control the flow of each gel component into the injection well 110. For example, in embodiments having components of a gel injectant pumped down the injection well 110 separately and sequentially, valves 133 positioned along gel feed lines 131 to each of the components in the gel feed 130 may be sequentially opened and closed to allow the components of the gel feed 130 to flow through the gel feed lines 131 at separate times. In embodiments having gel components premixed and provided from a single source, a single gel feed line 131 may fluidly connect the gel feed 130 to the injection wellhead 113.

In the system 100 shown in FIG. 1, separate foam feed valves 123 and gel feed valves 133 may be provided along foam feed lines 121 and gel feed lines 131, respectively, to control flow of the foam feed 120 and gel feed 130. In some embodiments, a foam feed line and a gel feed line may junction at a multi-way valve, which may be operated to selectively open and close the foam feed line and the gel feed line and allow or prevent the foam feed 120 or the gel feed 130 from flowing into the injection well 110.

Once directed to the injection well 110, a foam feed 120 or a gel feed 130 may be injected into an injection string 114 extending a depth from the surface 101 of the injection well 110 to a target formation 103. Foam feed 120 may be injected into the target formation 103 as a foam injectant, where the foam injectant may be foamed ex-situ at the surface 101 or in-situ in the target formation 103. Likewise, gel feed 130 may be injected into the target formation 103 as a gel injectant, where the gel injectant may be gelled ex-situ at the surface 101 or in-situ in the target formation 103. In different methods according to embodiments of the present disclosure, a gel injectant may be injected simultaneously with a foam injectant, or a gel injectant may be injected separately from and sequentially with a foam injectant, such as described in more detail below.

The injection plan for gel and foam injectants, including selection of forming the gel and foam injectants in-situ or ex-situ and selection of sequential injection or concurrent injection, may be designed based at least in part on the injection operation objective, the well system design, and the formation being treated. For example, the injection plan for gel and foam injectants may be designed, at least in part, based on the fracturing pressure of the formation being treated (where fracturing pressure is the pressure above which injection of fluids will cause the rock formation to fracture, or in other words, the maximum pressure the formation can take before breaking down). According to embodiments of the present disclosure, the injection pressure used for injection of the foam and gel injectants into the target formation may be less than the fracturing pressure of the formation being treated.

Foam injectants and gel injectants injected into the target formation 103 may be driven through the target formation 103 toward a production well 140 extending a depth from the surface 101 into the formation 102 and in fluid communication with the target formation 103. At least a portion of the production well 140 may be cased and have a production string 144 extending from a production wellhead 145 into the production well 140, where fluids directed from the formation into the production well 140 may be flowed through the production string 144 to be collected at the surface 101. In some embodiments, fluids (e.g., water or gas) collected from the production well 140 may be used for injection into the injection well 110.

Injectants may be driven through the target formation 103 from pressurizing the injection well 110, where the pressure from within the injection well 110 may push the injectants through the target formation 103. As injectants are moved through the target formation 103, the injectants may drive oil or other fluid in the target formation 103 to the production well 140. FIG. 1 shows an example of injectants 104 being injected from the injection well 110 into the target formation 103, where an oil bank 105 in the target formation 103 may be driven toward the production well 140. The area in the formation where the injectant 104 diffuses into the oil bank 105 in the reservoir may be referred to as a miscible zone 106. In some embodiments, water may be injected into the target formation (referred to as waterflooding) prior to or after injecting injectants into the target formation 103, where the injected water may be used for at least one of mixing with the injectants and driving fluids through the target formation 103.

Additionally, using both foam injectants and gel injectants in injection operations, such as described herein, an improved recovery of oil in the target formation 103 may be achieved. For example, injecting a gel injectant into an underground formation may block conductive fractures in the formation, thereby reducing the permeability of the formation, which may allow for other injected fluids (e.g., a foam injectant) to concentrate flow and diversion of any bypassed oil from a primary and/or secondary recovery effort.

Fluids including, for example, recovered oil, water, and injectants, may be recovered through the production well 140 and collected at the surface 101. In some embodiments, fluids recovered from the production well 140 may be processed (e.g., separated) and reused for injection into the injection well 110. For example, separated gas or water recovered from the production well 140 may be injected into the injection well 110 as a component of one or more injectants (e.g., a foam injectant component). In some embodiments, such as in offshore or near-shore well systems, seawater may be filtered and treated and then injected as a component of one or more injectants (e.g., a foam injectant component or a gel injectant component) into the injection well.

Systems 100 according to embodiments of the present disclosure may also include one or more sensors 150, 152 that measure one or more parameters useful for monitoring the progress of an injection operation. For example, at least one downhole sensor 150 may be positioned in the injection well 110 and/or in the production well 140. Examples of suitable downhole sensors 150 may include, but are not limited to, downhole temperature sensors, pressure sensors, fluid composition sensors (e.g., nuclear magnetic resonance (NMR) sensors), flow meters, and other mechanical or electronic devices that can measure various properties inside the well such as vibration, fluid flow properties, pressure, and temperature conditions. Additionally, at least one surface sensor 152 may be positioned at the surface of the wells, e.g., on surface equipment used to inject injectants into the injection well 110 or on surface equipment of the production well 140. Examples of surface sensors 152 may include, but are not limited to, temperature sensors, pressure sensors, fluid composition sensors, flow meters, viscometers, and others. In some embodiments, a sensor system, e.g., a system using fiber optics (e.g., distributed acoustic sensing (DAS) system or distributed temperature sensing (DTS) system), a permanent downhole monitoring system (PDHMS), sensor balls, and/or downhole cameras, may be installed to monitor conditions downhole and collect monitored conditions at the surface.

Additionally, in some embodiments, a system 100 may include a downhole sound wave tool 160 provided at an end of the injection string 114. For example, a downhole sound wave tool 160 may be provided as a sub that can be threadably connected to a string of pipe forming the injection string 114 or may be sent downhole on coiled tubing or a wireline. A downhole sound wave tool 160 may be a tool that is capable of emitting pulses of sound waves, and may be selected from, for example, at least one of an ultrasonic device, an infrasonic device, a microwave device, and an acoustic device. An ultrasonic device may emit sound wave vibrations of frequencies greater than the upper limit of the audible range for humans, including frequencies greater than about 20 kHz and up to several gigahertz (e.g., between 200 and 700 kHz). An infrasonic device may emit sound wave vibrations having frequencies less than the lower limit of the audible range for humans, e.g., at frequencies lower than about 20 Hz and down to about 0.1 Hz. An acoustic device may emit sound waves having frequencies within the audible range for humans, e.g., between about 20 Hz and 20 kHz.

Different injection methods according to embodiments of the present disclosure are described below, which may use injection systems similar to or as described with reference to FIG. 1. In the below description of injection methods, like elements from FIG. 1 may be referenced to show various elements in the injection methods.

Methods with Foam Formed Ex-Situ

According to embodiments of the present disclosure, a foam injectant may be foamed ex-situ, at the surface of an injection well 110, by mixing the components of the foam injectant at the surface 101. After a foam is generated from the mixing, the foamed foam injectant may be pumped through the injection well 110 into a target formation 103.

Figure 2:
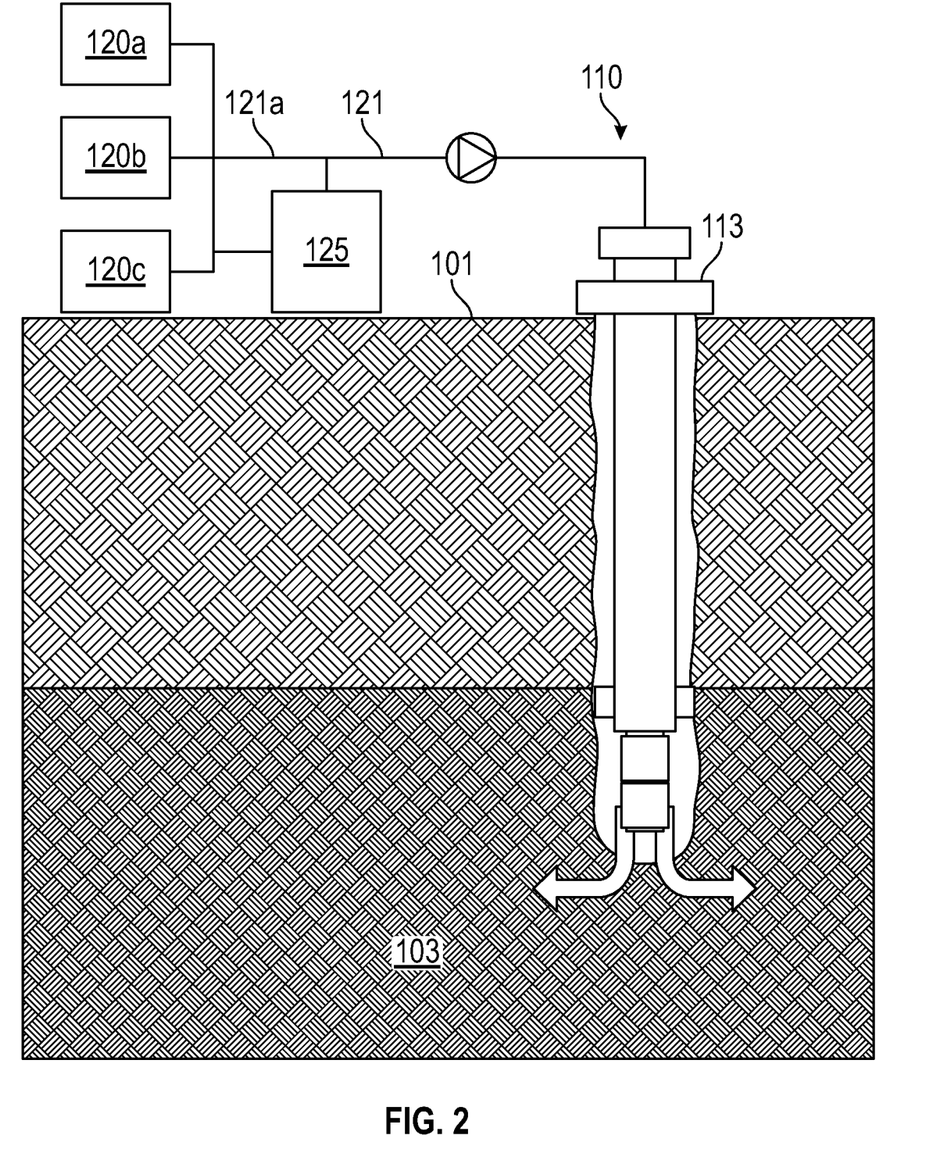
FIG. 2 shows part of an injection system according to embodiments of the present disclosure.

For example, as shown in FIG. 2, in some embodiments, a foam injectant composed of components including a surfactant 120a, water 120b, and gas 120c may be mixed in a foam generator 125 located at the surface 101 of an injection well 110 to create a foam. The components of the foam injectant may be metered into the foam generator 125 at a selected rate and timing for mixing and generating a foam. For example, the gas 120c (e.g., $CO_2$) may be metered into a porous medium (e.g., a matrix of beads) within the foam generator 125, and a surfactant solution (e.g., including the surfactant 120a and water 120b) may be injected into the porous medium at an injection rate, where the gas 120c mixes with the surfactant solution in the porous medium. According to embodiments of the present disclosure, the foam generator 125 may be operated continuously at a fixed rate or a variable rate (e.g., for pulsed injections). Bubble size in the foam may be affected by the shear gradient through the foam generator 125. Thus, maintaining a constant injection rate for components entering the foam generator 125 may provide a relatively constant bubble size in the foam.

The foamed foam injectant may then be pumped from the foam generator 125 down the injection well 110 at an injection pressure. Foam generated at the surface 101 may be flowed through one or more foam feed lines 121, including for example, flow passages provided through a manifold, and through an injection wellhead 113 into the injection well 110.

By forming a foam injectant ex-situ, more control over the foaming properties may be maintained, including, for example, the amount of mixing and bubble size generation in the foam. Thus, according to embodiments of the present disclosure, a foam injectant may be formed ex-situ in order to provide a more robust injectant when compared with some foam injectants foamed in-situ.

According to embodiments of the present disclosure, a method for designing an injection plan may include determining the formation fracturing pressure and a foam injection pressure for injecting a foam injectant foamed ex-situ. A foam injectant may be foamed ex-situ when the foam injection pressure at the bottom of the wellbore for injecting a foam injectant foamed ex-situ is less than the formation fracturing pressure. When the foam viscosity of a foam injectant foamed ex-situ is very high or the wellbore is very long (e.g., horizontal and multi-lateral wells), for example, the pressure gradient required to inject the foamed foam injectant into the formation becomes very high, such that the injection pressure of a foamed foam injectant may be greater than the formation fracturing pressure. In such cases, the injection plan may be designed to foam a foam injectant in-situ.

Methods with Foam Formed In-Situ

According to embodiments of the present disclosure, a foam injectant may be foamed in-situ within a formation. Foam may be formed in-situ by injecting the components of a foam injectant as separate components into the injection well. For example, in the embodiment shown in FIG. 2, one or more bypass foam feed lines 121a may bypass the foam generator 125 to fluidly connect each component (surfactant 120a, water 120b, and gas 120c) of the foam feed to the injection well 110. Each of the foam injectant components may be individually pumped into the injection well 110 via the bypass foam feed lines 121a at an injection pressure. Components of a foam injectant may be pumped as separate components into the injection well simultaneously or sequentially. When the components of a foam injectant are injected into an injection well 110, the components may mix and create a foam.

In some embodiments, water may be injected into the formation prior to injecting surfactant and gas components of a foam injectant into the formation. For example, prior to injecting surfactant and gas components of a foam injectant into the formation, a waterflooding process may be performed, for example, where water may be injected into the injection well and into the formation as a secondary recovery process to recover oil in the formation (e.g., via a nearby production well). After the waterflooding process, water may remain in the formation. Surfactant and gas components of a foam injectant may then be injected into the formation through the injection well. When the surfactant and gas components reach the water in the formation, the shearing forces from the mixing fluids may create foam, thereby foaming the foam injectant in-situ in the formation.

In some embodiments, an injection plan may include determining a compatibility between the surfactant to be used in a foam injectant and a formation rock in which the foam injectant is to be injected. For example, a surfactant slug may be injected into a core-plug (representative of the formation to be injected with the foam injectant), and then the surfactant concentration in the injected slug may be compared with the surfactant concentration in the effluent to determine a volume percentage of surfactant that may be lost (absorbed) into the formation. Such compatibility determination may be used to predict whether the surfactant may get absorbed into the formation. When surfactant is absorbed into the formation, the loss of the surfactant may prevent sufficient foaming of the foam injectant. In some embodiments, surfactant adsorption may be minimized at the formation to be treated by injecting a sacrificial surfactant slug into the formation prior to the injection of the intended foaming agent.

Forming a foam injectant in-situ may allow for use of a decreased injection pressure when compared with foam injectants formed ex-situ. For example, ex-situ formed foam may be more viscous (and thus create more friction while being pumped downhole) when compared to the individual components (e.g., a surfactant solution and gas component) of the foam injectant. Due to the comparatively high viscosity and friction from pumping ex-situ formed foam injectants, a relatively higher injection pressure may also be needed to pump the foamed foam injectant into a target formation. In some cases, the injection pressure of an ex-situ formed foam injectant may be higher than the fracturing pressure in target formation. In such cases, a lower injection pressure may be used to pump individual components of the foam injectant downhole and form the foam in-situ, thereby allowing for an injection pressure of the foam injectant that is lower than the target formation fracturing pressure. Thus, according to some embodiments, components of a foam injectant may be injected individually into a target formation to be foamed in-situ in order to use an injection pressure lower than a fracturing pressure of the target formation.

Figure 6:
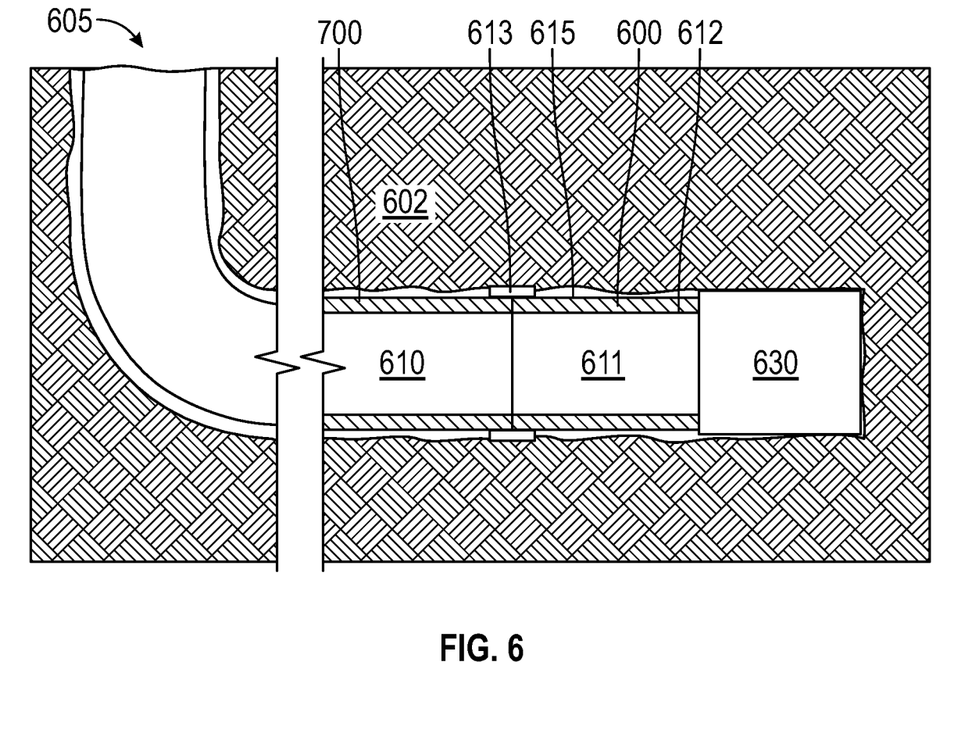
FIG. 6 shows a cross-sectional view of an injection system according to embodiments of the present disclosure.

In some embodiments, such as shown in FIG. 6, a foam injectant 600 may be provided on a tool (e.g., a drill string sub or a portion of the drill string tubing) installed permanently downhole next to the target formation, e.g., in vertical sections of a well 605, or inside the target formation, e.g., in horizontal sections of the well 605. For example, in some embodiments, a foam injectant may be provided in the form of chips that may be stored in a compartment 615 of a tubing 612. In some embodiments, a foam injectant may be provided in the form of a coating, which may be applied to compartments with an inflow control device (ICD) along the tubing 612 (e.g., coating a sand screen, ICD nozzles, or other ICD surface). A chamber 630 of compressed super critical $CO_2$ may be provided in the well 605 (e.g., at the toe (end) section of the well 605) and fluidly connected to the foam injectant compartments 615 in the downhole tubing 612. $CO_2$ may be released from the chamber 630 and directed through a selected compartment 615 for intervention in the formation 602 around the selected compartment 615. For example, in some embodiments, sections 610, 611 of tubing may be isolated by packers 613 or other sealing devices, which may allow for treatment of selected portions of the formation 602 surrounding each isolated section 610, 611 of the well. As the $CO_2$ is directed through the selected compartment 615, the $CO_2$ may pick up and foam the foam injectant 600 within the compartment 615 and direct the mixture out of the compartment (e.g., through a sand screen or through another opening) to the surrounding formation 602 to inject foam within the formation 602.

Methods with Gel Formed Ex-Situ

According to embodiments of the present disclosure, a gel injectant may be gelled ex-situ, at the surface 101 of the injection well 110, prior to injecting the gel injectant into a target formation 103. In such embodiments, the components of a gel injectant (e.g., a polymer, a crosslinker, and water) may be mixed together at the surface of the injection well and then, after waiting a gelation time for crosslinking between the polymer to form a gel, the gel may be pumped down the injection well and injected into the target formation.

For example, in some embodiments, a water-soluble polymer and a crosslinker may be mixed with water (e.g., seawater, fresh water, or other water) at the surface of an injection well. Then, after waiting a gelation time, where a sufficient amount of crosslinking has occurred between the water-soluble polymer to form a gel, the gel may be injected into a target formation through the injection well.

In some embodiments, a retarding agent may be added to the gel injectant at the surface to delay complete gelation (by a delay period), which may allow easier pumping of the gel into the formation. If a gel sets in an undesirable location along the injection path and/or clogs an area into the formation (e.g., clogged rock pores), the effected areas may be treated with an acid wash.

Methods with Gel Formed In-Situ

According to some embodiments, gel injectants may be gelled in-situ in a target formation 103. A gel injectant may be gelled in-situ, for example, by injecting components of the gel injectant sequentially into the formation through the injection well and waiting a gelation time for crosslinking between the polymer component(s) in the gel injectant. For example, one of a polymer or a crosslinker may be first pumped down the injection well 110 into the target formation 103, and then the other of the polymer or crosslinker may be pumped down the injection well 110 into the target formation 103. The polymer, the crosslinker, or both may be pumped downhole with water. When the polymer and the crosslinker components interact within the target formation 103, sufficient crosslinking may occur within the formation to form a gel.

In some embodiments, a gel injectant may be gelled in-situ in the formation by designing a composition of the gel injectant to have a gelation time that is longer than the pumping time to pump the gel injectant components from the surface to the formation. For example, the pumping time to pump fluids from the surface 101, through the injection well 110, and to the target formation 103 may be determined at least in part based on the distance through the injection well 110 from the surface to the target formation 103 and the flow rate of the fluid being pumped through the injection well 110. The gelation time may be determined at least in part based on gelation factors such as the type and amount of polymer and crosslinker used in the composition, the target formation temperature (where higher downhole temperatures may generally shorten gelation time), salinity of the water (provided in the formation or pumped with the other gel injectant components), and pH of the gel injectant solution and in the formation. According to embodiments of the present disclosure, the composition of the gel injectant may be designed to have a selected gelation time based on a proposed pumping time.

In some embodiments, such as shown in FIG. 6, a gel injectant 700 may be provided on a tool (e.g., a drill string sub or a portion of the drill string tubing) installed permanently downhole next to the target formation, e.g., in vertical sections of a well 605, or inside the target formation, e.g., in horizontal sections of the well 605. For example, in some embodiments, a gel injectant may be provided in the form of chips that may be stored in a compartment 615 of a tubing 612. A chamber 630 of compressed super critical $CO_2$ fluidly connected to the gel injectant compartments 615 may release $CO_2$ to be directed through a selected compartment 615 for intervention in the formation 602 around the selected compartment 615. As the $CO_2$ is directed through the selected compartment 615, the $CO_2$ may pick up the gel injectant 700 and direct the mixture out of the compartment (e.g., through a sand screen or through another opening) to the surrounding formation 602 to inject gel within the formation 602. In the embodiment shown in FIG. 6, both gel injectants 700 and foam injectants 600 may be provided with a downhole tool (e.g., in a compartment of a tubing, such as a liner). Gel injectants 700 and foam injectants 600 may be provided in the same compartment 615 or different compartments 615. In some embodiments, only one of gel injectants 700 or foam injectants 600 may be provided with a downhole tool.

Methods of Sequential Injection

Figure 3:
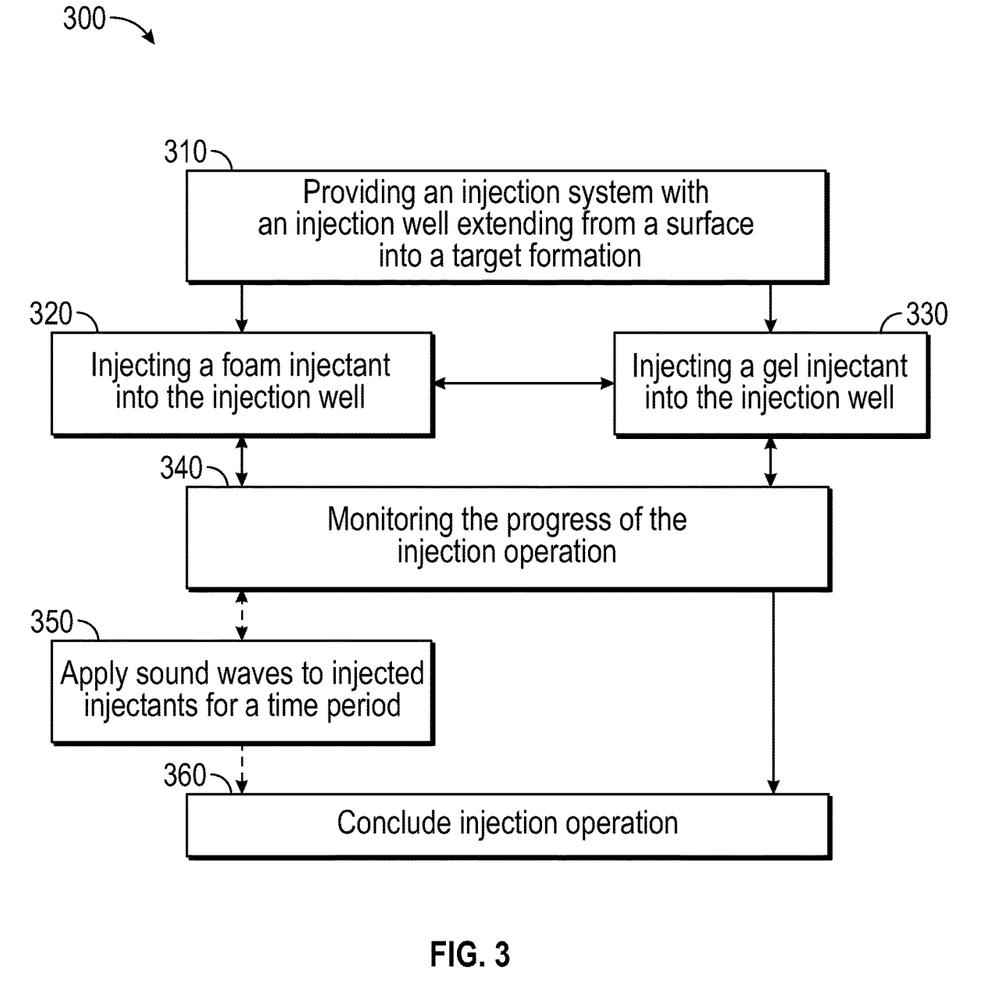
FIG. 3 shows a method according to embodiments of the present disclosure.

According to embodiments of the present disclosure, a gel injectant and a foam injectant may be injected at separate times and sequentially into a target formation. For example, FIG. 3 shows an example of sequential injection methods according to embodiments of the present disclosure. In an injection method 300, an injection system may be provided (e.g., such as injection system 100 shown in FIG. 1) having an injection well extending from a surface into a formation (step 310). A foam injectant and a gel injectant may be alternatingly injected into the injection well one or more times, shown as steps 320 and 330, where the foam injectant may be composed of a liquid phase made of a surfactant and water and a gas phase, and the gel injectant may be composed of a water-soluble polymer and a crosslinker. In some embodiments, the foam injectant may be injected into the injection well (step 320) prior to injecting the gel injectant into the injection well (step 330). In some embodiments, the gel injectant may be injected into the injection well (step 330) prior to injecting the foam injectant into the injection well (step 320).

The order of injecting one type of injectant before the other type of injectant may be selected, for example, depending on the permeability and structure of the target formation, the compositions of the foam and gel injectants, and whether the injectants are foamed or gelled in-situ or at the surface. For example, in some embodiments of injecting injectants into a formation having relatively large pores, a gel injectant may be injected into the formation first, and then a foam injectant may be injected into the formation after the gel injectant. Conversely, when injecting injectants into a formation having relatively small pores (where a gel may block subsequent propagation of a foam injectant into the formation) a foam injectant may be injected into the formation first, and then a gel injectant may be injected into the formation after the foam injectant. Accordingly, pore size and heterogeneity of the formation may be evaluated and considered prior to forming an injection strategy.

Depending on the well operation and the progress of the injection, foam and gel injectants may be alternatingly injected into an injection well a single time each or multiple times each.

When gel and foam injectants are injected sequentially into a formation, the flow paths of each injectant may vary depending on, for example, the heterogeneity of the formation material properties and microstructure and on the order and type of injectants being injected into the formation. For example, a gel injectant may first flow through high permeability zones and/or fractures within a formation, and after gelation, the gel may divert subsequent injectants to unswept zones within the formation. Due to the effective mobility control of the injectants, gravity override may be substantially reduced.

Additionally, each of the gel injectant and the foam injectant may either be formed in-situ in the formation or ex-situ at the surface. For example, in some embodiments, one of the gel injectant or the foam injectant may be formed in-situ (where either the foam injectant may be foamed in-situ or the gel injectant may be gelled in-situ), and the other of the gel injectant or the foam injectant may be formed ex-situ at the surface (where either the gel injectant may be gelled ex-situ or the foam injectant may be foamed ex-situ). In some embodiments, both injectants may be formed in-situ, where the foam injectant may be foamed in-situ and the gel injectant may be gelled in-situ. In some embodiments, both injectants may be formed ex-situ, where the foam injectant may be foamed ex-situ and the gel injectant may be gelled ex-situ. Selecting where each injectant is formed may depend, for example, on the compositions of the injectants, the downhole conditions (e.g., pressure, temperature, salinity, and pH conditions), the depth of injection, the permeability of the target formation, and the objective of the injection operation (e.g., enhanced recovery operation, water shut-off operation, etc.). For example, ex-situ formation of a gel or foam may be used for injection in shallower depth and higher porosity zones or formations with a fracture network that has super permeability, whereas in-situ formation of a gel or foam may be used for injection in deeper formations and lower porosity and permeability.

The injection operation may be monitored (step 340) using one or more sensors positioned downhole and/or at the surface (e.g., using at least one downhole sensor in the injection well and at least one surface sensor at the surface). Sensors may be used to monitor injection of both the gel injectant and the foam injectant. Additionally, monitoring may include using the sensors to monitor the injection system while an injectant is being pumped down the injection well (e.g., using sensors to monitor the flow rate of the injectant, the viscosity of the injectant, temperature, and pressure) and after an injectant is injected into a target formation (e.g., using downhole sensors to monitor temperature and pressure of the target formation). In some embodiments, an injection operation may be monitored continuously during the entire injection operation.

Based on data received from monitoring the injection operation, one or more additional injection steps may be performed, e.g., performing a subsequent injection step to inject a foam injectant into the injection well and/or performing a subsequent injection step to inject a gel injectant into the injection well. In such manner, an operator may monitor and make sure a sufficient amount of foam injectants and/or gel injectants are used to successfully achieve a desired outcome to the injection operation (in step 360).

In some embodiments, as shown in step 350, sound waves may optionally be used to enhance foaming and/or gelling in the formation. For example, a downhole sound wave tool connected to a string of pipe or wireline may be extended into the injection well, such that the downhole sound wave tool is positioned along an injection section of the injection well (at a location where injection fluids flow from the injection well into the target formation). When a downhole sound wave tool is sent downhole to a location of fluid injection into the target formation, sound waves may be emitted from the downhole sound wave tool into the target formation to enhance foaming of the foam injectant or gelling of the gel injectant. Sound waves may be applied to an injected formation for an extended period of time (e.g., a day, more than one day, or weeks) to improve performance of the injectants. According to embodiments of the present disclosure, other injection enhancement procedures may be used to further enhance performance of the injection operation. For example, a batch reactor may be used at the surface to help mix components of an injectant, which may prompt faster reactions in foaming and gelation processes.

Methods of Simultaneous Injection

Figure 4:
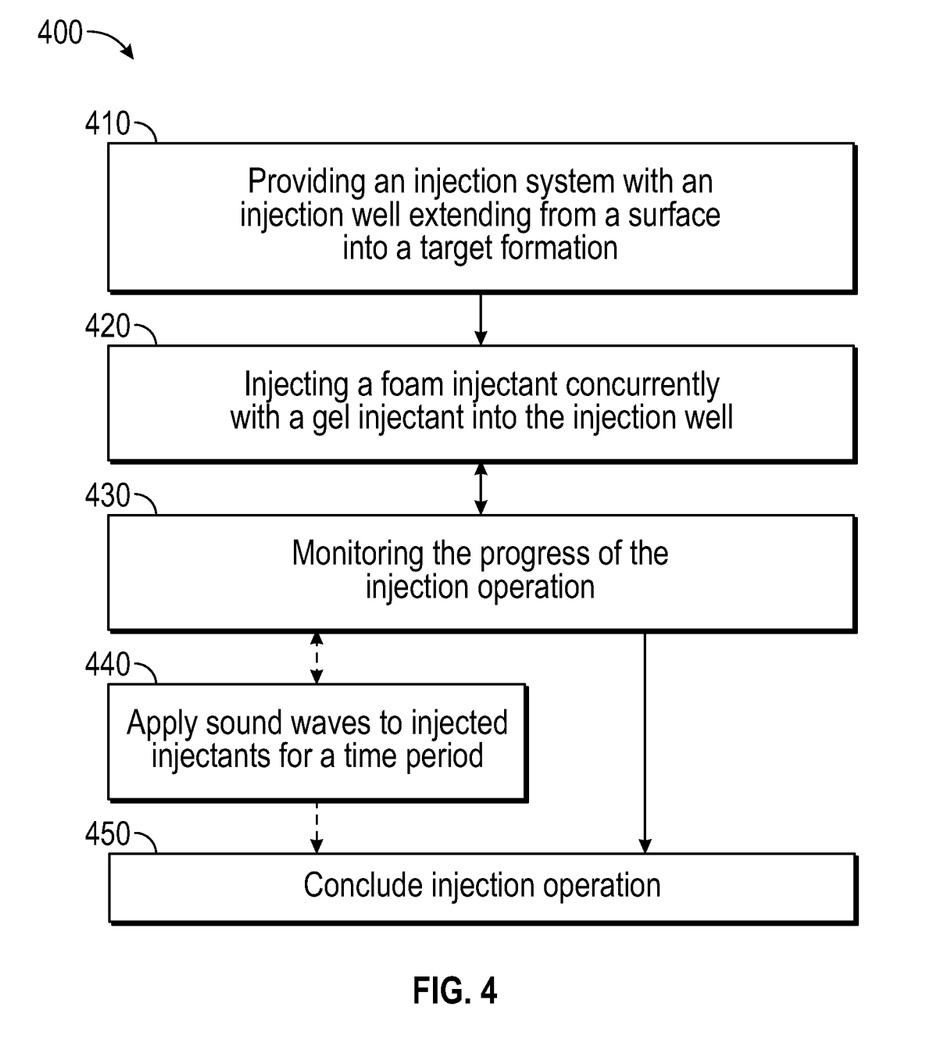
FIG. 4 shows a method according to embodiments of the present disclosure.

According to embodiments of the present disclosure, a gel injectant and a foam injectant may be injected simultaneously through an injection well and into a target formation. For example, FIG. 4 shows an example of concurrent injection methods according to embodiments of the present disclosure. In an injection method 400, an injection system may be provided (e.g., such as injection system 100 shown in FIG. 1) having an injection well extending from a surface into a formation (step 410). A foam injectant and a gel injectant may be concurrently injected into the injection well one or more times, shown as step 420, where the foam injectant may be composed of a liquid phase made of a surfactant and water and a gas phase, and the gel injectant may be composed of a water-soluble polymer and a cross-linker. Depending on the well operation and the progress of the injection, foam and gel injectants may be concurrently injected into an injection well a single time or multiple times.

The injection operation may be monitored (step 430) using one or more sensors positioned downhole and/or at the surface (e.g., using at least one downhole sensor in the injection well and at least one surface sensor at the surface). Based on data received from monitoring the injection operation, one or more additional injection steps may be performed. In such manner, an operator may monitor and make sure a sufficient amount of foam injectants and/or gel injectants are used to successfully achieve a desired outcome to the injection operation (in step 450).

In some embodiments, as shown in step 440, after injecting the gel injectant and the foam injectant concurrently into the formation, sound waves may optionally be used to enhance foaming and/or gelling in the formation. For example, a downhole sound wave tool connected to a string of pipe or wireline may be extended into the injection well, such that the downhole sound wave tool is positioned along an injection section of the injection well (at a location where injection fluids flow from the injection well into the target formation). When a downhole sound wave tool is sent downhole to a location of fluid injection into the target formation, sound waves may be emitted from the downhole sound wave tool into the target formation to enhance foaming of the foam injectant or gelling of the gel injectant.

According to embodiments of the present disclosure, when gel and foam injectants are injected together into an injection well, the gel injectant may be gelled in-situ in the formation, after being injected, while the foam injectant may be foamed ex-situ at surface, prior to being injected.

In some embodiments, when gel and foam injectants are injected together into an injection well, the foam injectant may be foamed in-situ in the formation, after being injected, while the gel injectant may be gelled ex-situ at surface, prior to being injected.

In some embodiments, when gel and foam injectants are injected together into an injection well, both the gel injectant and the foam injectant may be formed ex-situ at the surface, prior to being injected into the injection well.

In some embodiments, when gel and foam injectants are injected together into an injection well, both the gel injectant and the foam injectant may be formed in-situ in the formation, after being injected into the injection well.

Other Methods

As described above, gel injectants may be gelled in-situ, in a formation, after being injected into the formation, and foam injectants may be foamed in-situ, in the formation, after being injected into the formation. Additionally, gel and foam injectants may be formed in-situ whether they are injected sequentially (at separate times) or injected concurrently (at the same time). In some embodiments, when a gel injectant and a foam injectant are both formed in-situ (whether they are injected into the injection well sequentially or concurrently), the injectants may be activated at the same time using a single triggering fluid.

Figure 5:
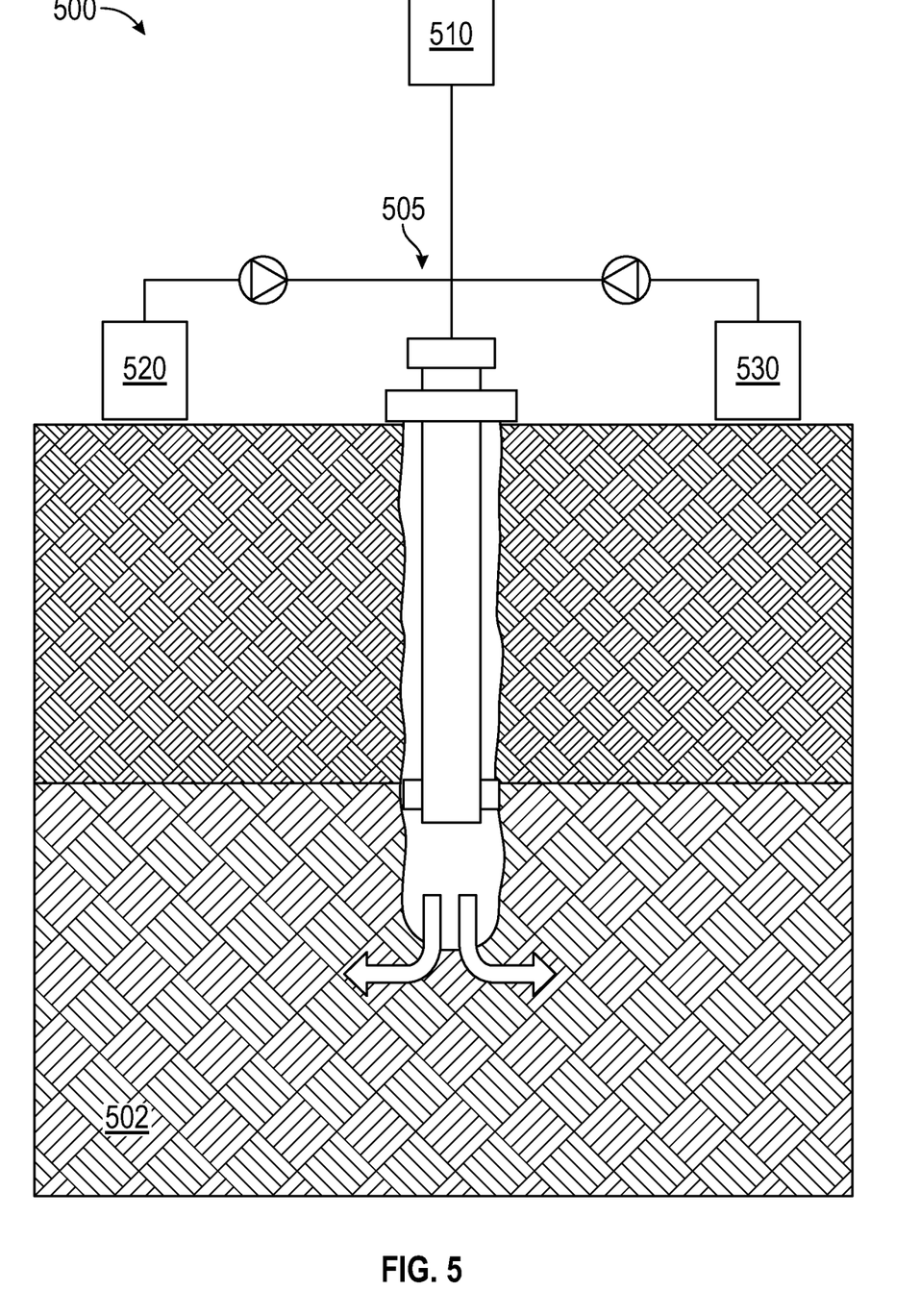
FIG. 5 shows an injection system according to embodiments of the present disclosure.

For example, FIG. 5 shows an example of an injection system 500 according to embodiments of the present disclosure, where foam injectants and gel injectants may be activated in-situ using a single triggering fluid 510 to simultaneously gel the gel injectant and foam the foam injectant in a target formation 502. As shown, a foam feed 520 and a gel feed 530 may each be fluidly connected to an injection well 505 extending from the surface to the target formation 502. The foam feed 520 and the gel feed 530 may be injected through the injection well 505 into the target formation 502 either simultaneously or sequentially. After injecting the foam feed 520 and the gel feed 530 into the target formation, a triggering fluid 510 may be injected through the injection well 505 into the target formation 502. Once the triggering fluid is injected into the target formation 502 and mixes with the foam feed 520 and gel feed 530, the triggering fluid may simultaneously foam the foam feed 520 to form the foam injectant in-situ and gel the gel feed 530 to form the gel injectant in-situ.

FIG. 6 shows another example of an injection system according to embodiments of the present disclosure where a single triggering fluid may be used to activate in-situ foam injectants and gel injectants, where the triggering fluid may be compressed super critical $CO_2$ held in a downhole chamber 630. In the embodiment shown in FIG. 6, the triggering fluid may be released from the downhole chamber 630 (rather than being pumped from the surface) to activate the foam and/or gel injectants.

In some embodiments, after injecting a triggering fluid into the formation to activate foam and gel injectants, an injection operation may include waiting a period of time for soaking (e.g., between 3 and 30 days). During a soaking period, production and injection may be put on-hold. Additionally, in some embodiments, downhole sound wave tools may be positioned downhole to apply sound waves (e.g., infrasonic, acoustic, or ultrasonic) to the treated formation after the triggering fluid has been injected.

According to embodiments of the present disclosure, a waterflooding operation may be performed, where water may be injected into the target formation, after the injectant operation. For example, in some embodiments, a waterflooding operation may be performed after an injectant operation that includes injecting gel and foam injectants into the target formation, injecting a triggering fluid into the target formation, and waiting a soaking period. By performing injectant operations according to embodiments of present disclosure prior to waterflooding, the foam and gel injectants from the injectant operation may provide an improved flow path through the formation for the waterflooding operation, thereby resulting in an improved water treatment job.

Comparative Results

An improved recovery factor (IRF) was used to compare improvements from methods using a combination of gel and foam injectants, as described herein, over conventional treatment methods. For example, to compare improvements from a gel-foam injection over waterflooding (WF) alone to recover oil from a target formation, the incremental oil recovery from a core sample can be expressed with reference to sample testing parameters, including original oil in core (OOIC), remaining oil in core (ROIC), and oil recovery by waterflooding (ORWF), which are defined as:

$$RF_{Post-WF} = \frac{S_{oi} - S_{o(Post-WF)}}{S_{oi}}$$

$$RF_{Post-gel-foam} = \frac{S_{oi} - S_{o(Post-gel-foam)}}{S_{oi}}, \ldots$$

$$IFR \% \text{ of } OOIC = RF_{Post-gel-foam} - RF_{Post-WF}$$

$$IRF \% \text{ of } ROIC = \frac{\% \text{ of } OOIC}{(100 - RF_{Post-WF})} \times 100$$

$$IRF \% \text{ of } ORWF = \frac{\% \text{ of } OOIC}{RF_{Post-WF}}$$

where RF is recovery factor, $S_{oi}$ is the initial oil saturation, $S_{o(Post-WF)}$ is the oil saturation after the initial waterflood, $S_{o(Post-gel-foam)}$ is the oil saturation after the gel-foam treatment, and IRF is incremental recovery factor. After calculating these values, the results may be recorded in tables or charts to compare improvements from the different treatments. From such comparisons, it can be shown that by using gel-foam injection methods disclosed herein, an improved recovery may be achieved when compared to conventional secondary and tertiary recovery methods.

Additionally, although some conventional EOR methods have proposed alternating injections of gas and water ("water alternating gas" or WAG cycles), such methods have resulted in volumetric sweep inefficiencies due to, for example, viscous fingering, reservoir heterogeneity, and gravity override/segregation. By using a combination of a gelled injectant and foamed injectant to sweep a formation, according to embodiments disclosed herein, an improved rate of recovery may be achieved.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method, comprising:
providing an injection well extending from a surface into a formation; and alternatingly pumping a foam injectant and a gel injectant into the injection well;
wherein the foam injectant comprises:
a liquid phase comprising a surfactant and water; and
a gas phase comprising a gas;
wherein the gel injectant comprises a water-soluble polymer and a crosslinker; and
wherein the foam injectant and the gel injectant are injected at separate times and sequentially; and
using the injected gel injectant and the injected foam injectant to drive a reservoir fluid in the formation to a production well a distance from the injection well.

2. The method of claim 1, wherein the gel injectant is gelled in-situ in the formation, wherein injecting the gel injectant comprises:
injecting components of the gel injectant sequentially into the formation through the injection well; and
waiting a gelation time for crosslinking between the water-soluble polymer.

3. The method of claim 1, wherein the gel injectant is gelled ex-situ at the surface, wherein injecting the gel injectant comprises:
mixing the water-soluble polymer and the crosslinker with water at the surface;
waiting a gelation time for crosslinking between the water-soluble polymer to form a gel; and
injecting the gel into the formation.

4. The method of claim 1, wherein the foam injectant is foamed in-situ in the formation, wherein injecting the foam injectant comprises:
injecting the surfactant, the water, and the gas as separate components into the injection well at an injection pressure;
wherein the components mix into a foam as the components are injected.

5. The method of claim 1, wherein the foam injectant is foamed ex-situ at the surface, wherein injecting the foam injectant comprises:
mixing the surfactant, the water, and the gas in a foam generator to create a foam; and
pumping the foam down the injection well at an injection pressure.

6. The method of claim 1, wherein the foam injectant is formed in-situ, and the gel injectant is formed at the surface.

7. The method of claim 1, further comprising:
extending an injection string into the injection well, wherein the injection string comprises a downhole sound wave tool connected to a string of pipe,
wherein the downhole sound wave tool is selected from a group consisting of an ultrasonic device, an infrasonic device, and an acoustic device; and
wherein the downhole sound wave tool comprises a body that is a sub threadably connected at an end of the string of pipe; and
sending sound waves from the downhole sound wave tool into the formation to enhance foaming or gelling.

8. The method of claim 1, further comprising monitoring injection of the gel injectant and the foam injectant using at least one downhole sensor in the injection well and at least one surface sensor at the surface.

9. The method of claim 1, further comprising injecting water into the formation prior to injecting the gel injectant and the foam injectant.

10. A method, comprising:
providing an injection well extending from a surface into a formation; and
pumping a gel injectant and a foam injectant simultaneously through the injection well and into the formation;
wherein the foam injectant comprises:
a liquid phase comprising a surfactant and water; and
a gas phase comprising a gas; and
wherein the gel injectant comprises a water-soluble polymer and a crosslinker; and
using the injected gel injectant and the injected foam injectant to drive a reservoir fluid in the formation to a production well a distance from the injection well.

11. The method of claim 10, wherein the gel injectant is gelled in-situ in the formation, and the foam injectant is foamed ex-situ at surface.

12. The method of claim 10, wherein the gel injectant is gelled ex-situ at the surface, and the foam injectant are foamed ex-situ at the surface.

13. The method of claim 10, wherein gel injectant is gelled in-situ in the formation, and foam injectant is foamed in-situ in the formation.

14. The method of claim 13, further comprising injecting a triggering fluid down the injection well to simultaneously gel the gel injectant and foam the foam injectant in-situ by the triggering fluid.

15. The method of claim 10, further comprising:
threadedly connecting a downhole sound wave tool to an end of a string of pipe, wherein the downhole sound wave tool comprises a body that is a sub with a threaded connection; and
emitting sound waves from the downhole sound wave tool into the formation after injecting the gel injectant and the foam injectant into the formation.

16. A system, comprising:
an injection well extending from a surface into an underground formation, wherein the injection well comprises:
an injection wellhead positioned at an opening to the injection well at the surface; and
injection tubing extending from the injection wellhead a depth into the injection well;
a production well extending from the surface and in fluid communication with the underground formation;
a foam feed fluidly connected to the injection well via a foam feed line, wherein the foam feed comprises a surfactant and water;
a gel feed fluidly connected to the injection well via a gel feed line; and
a foam line valve positioned along the foam feed line and a gel line valve positioned along the gel feed line to selectively open and close the foam feed line and the gel feed line, respectively.

17. The system of claim 16, further comprising an injection string extending from the surface into the injection well, wherein the injection string comprises a downhole sound wave tool connected to a string of pipe, wherein the downhole sound wave tool comprises a body that is a sub threadably connected at an end of the string of pipe, and wherein the downhole sound wave tool is selected from a group consisting of an ultrasonic device, an infrasonic device, and an acoustic device.

18. The system of claim 16, further comprising at least one sensor positioned in the injection well or at the surface.

19. The system of claim 16, wherein the foam feed further comprises a gas selected from a group consisting of nitrogen gas and carbon dioxide gas.

20. The system of claim 16, wherein the gel feed comprises sulfonated polyacrylamide and a Cr(III) crosslinker.

\* \* \* \* \*